Patented Nov. 4, 1930

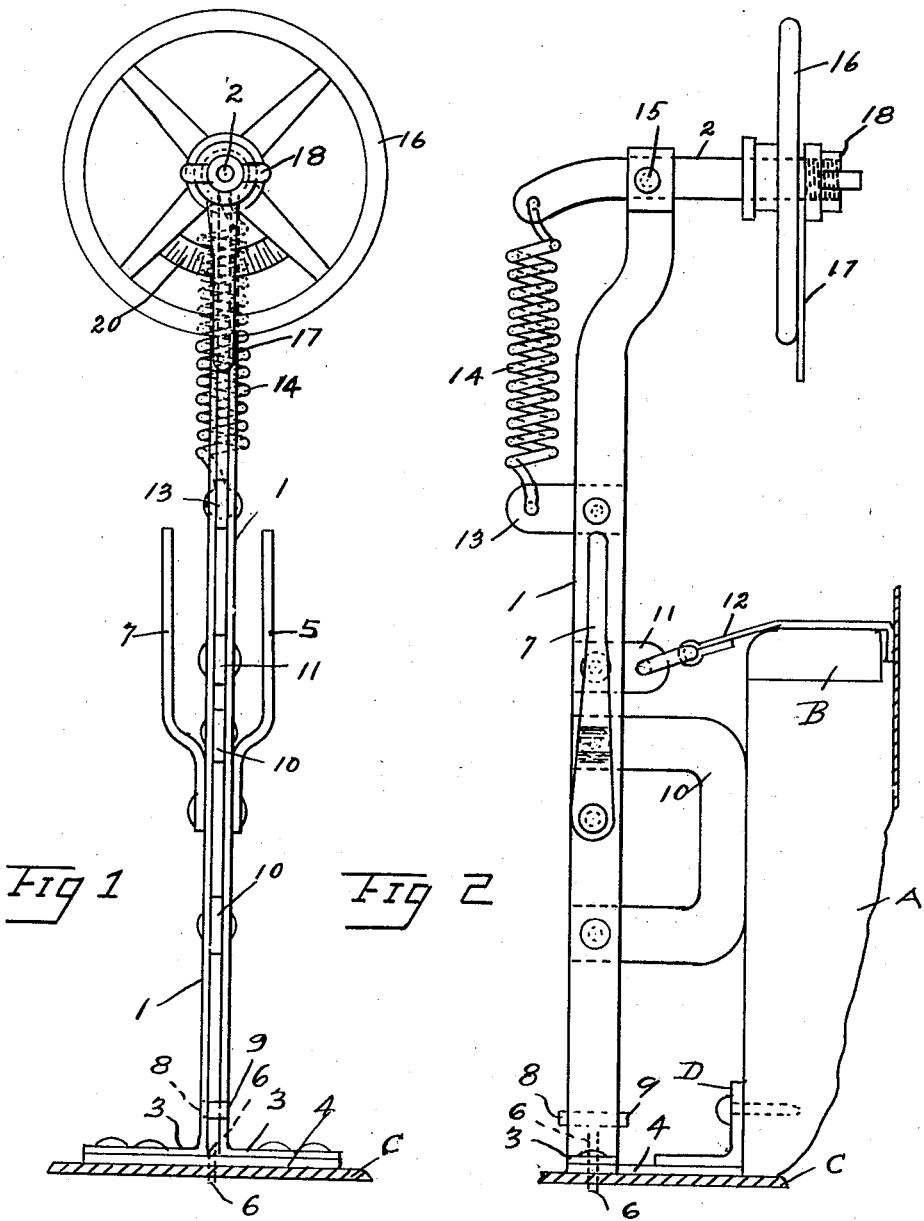

1,780,855

UNITED STATES PATENT OFFICE

WILLIAM R. WILLIAMS, OF SALT LAKE CITY, UTAH

TOY

Application filed September 20, 1928. Serial No. 307,239.

This invention relates to a toy to represent a steering wheel of an automobile, but has nothing to do with the steering of a vehicle, or in other words it is not a steering wheel.

The object of this invention is to provide a toy or dummy steering wheel for a small child to play with when riding in an automobile in such a manner that the child can play with the wheel and make all the movements of the driver of the automobile without interfering with the driving wheel.

With these and other objects in view the invention consists of the following construction and arrangement of parts to be fully described and claimed.

In the drawing forming a part of this specification and in which corresponding parts are denoted by like reference characters, is illustrated the preferred form of the invention capable of carrying the same into practical operation.

Figure 1 is a view of the invention looking at it from the vehicle seat.

Fig. 2 is a side view of the invention.

The reference character A denotes a vehicle seat, B a cushion on the seat, C the floor of the vehicle, D a cleat secured to the vehicle seat for holding the invention in place.

The invention comprises an upright 1 which supports a shaft 2 at its upper end. The shaft is pivotally connected to the upright by a pin 15. On one end of the shaft is attached a wheel 16. On the face of the wheel are graduate marks 20 over which a lever 17 operates.

The wheel 16 and the lever 17 are pivotally secured on the shaft 2 by a thumb screw 18.

One end of a spring 14 is secured to the shaft 2 and the other end to a bracket 13 secured to the upright 1. The spring 14 maintains the wheel in its normal position.

On the sides of the upright are pivotally placed levers 5 and 7 which can be shifted by a child at its will as a brake lever or as a clutch lever.

A bracket 11 secured to the upright has a strap 12 attached thereto and the other end of the strap is secured to the back of the cushion in any desired manner.

A handle or brace 10 is secured to the upright by rivets. The lower end of the upright is bent at right angles and is secured to a plate 4 by means of rivets.

The plate 4 is placed between the floor C and the bracket D for holding the upright in place.

Located at the bottom of the upright is a sliding pin 6 which operated between the legs of the upright and passes through an aperture in the floor of the vehicle to prevent the upright moving from under the anchor plate D.

In the operation of the invention by the child, the child sitting on the seat of the vehicle, the toy is placed in front of it, and secured to the vehicle as stated above, the child places its hand on the wheel which revolves on the shaft and if the child wishes to go through the movement of shifting gears or setting the brake it moves one of the levers on the side of the support.

Having thus described the parts of my invention what I claim as new and desire to secure by Letters Patent, is:

1. In a toy of the character described comprising an upright support carrying a shaft pivotally attached to its upper end, said shaft having a wheel on one end thereof and a spring on the other end thereof, said wheel to be moved by a child, said spring at its lower end being attached to the support, said spring holding said shaft in its proper position, graduate marks on the face of said wheel to indicate to the child the desired movement it wishes to make of the wheel, levers pivotally placed on said support, means for attaching said toy to a vehicle all substantially as set forth.

2. In a toy of the character described comprising an upright detachably placed in front of a vehicle seat, a tilting rod pivotally attached to upper end of said upright, said rod having a hand wheel on one end thereof and a spring on its other end, said wheel having graduate marks thereon, said spring holding said rod in its normal position, levers one of which is placed on one side of said upright and the other on the other side of said upright, said levers being pivotally secured to said upright and means for holding said upright in front of said seat, all substantially as set forth.

WILLIAM R. WILLIAMS.